W. G. HUYETT.
Harvesting Machine.
No. 9,779.  Patented June 14, 1853.
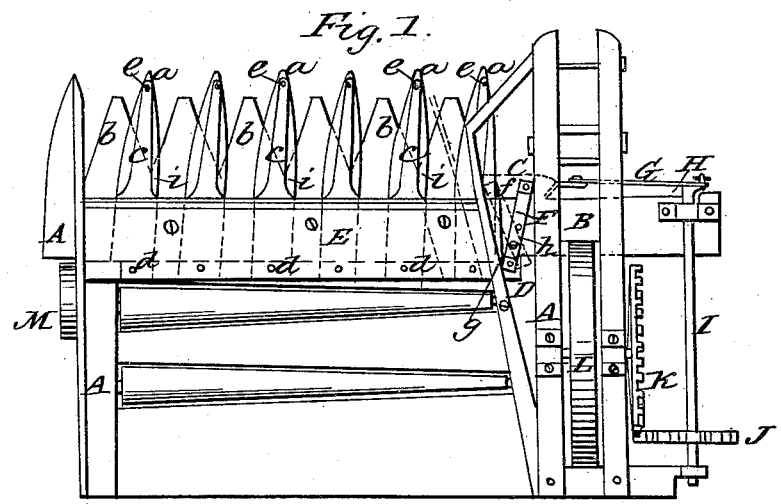
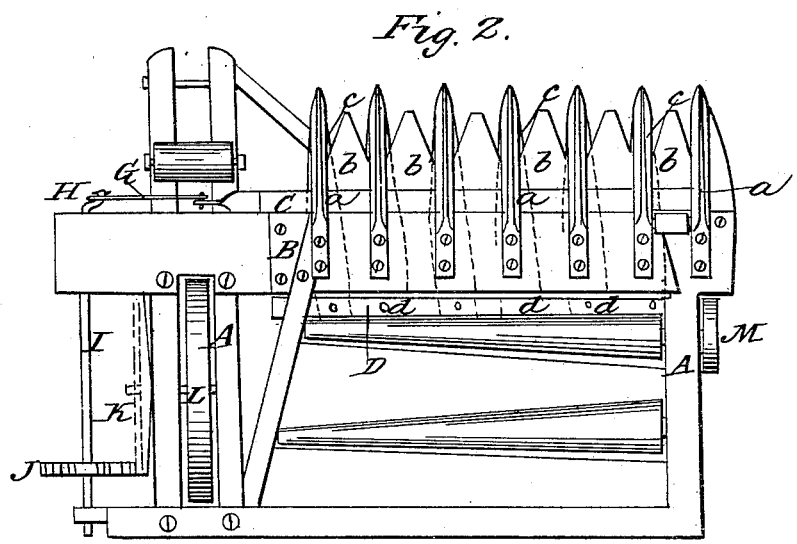
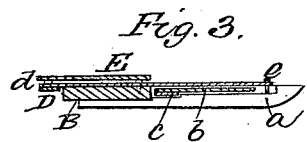

UNITED STATES PATENT OFFICE.

WM. G. HUYETT, OF WILLIAMSBURG, PENNSYLVANIA.

IMPROVEMENT IN HARVESTERS OF GRAIN AND GRASS.

Specification forming part of Letters Patent No. 9,779, dated June 14, 1853.

*To all whom it may concern:*

Be it known that I, W. G. HUYETT, of Williamsburg, in the county of Blair and State of Pennsylvania, have invented a certain new and useful Improvement in Harvesting-Machines; and I do hereby declare that the following is a full, clear, and exact description of the same, reference being had to the annexed drawings, making a part of this specification, in which—

Figure 1 is a top or plan view of the machine. Fig. 2 is an inverted plan or an under view of the same. Fig. 3 is a cross-section of the front plate, to which the teeth are attached.

Similar letters of reference indicate corresponding parts in each of the several figures.

The nature of my invention consists in having two series or sets of cutting-knives, one set of which (the lower ones) are of triangular form or the shape of saw-teeth, and have a reciprocating motion communicated to them in a direction crosswise of the machine. The other or upper set of knives work directly over the lower ones, above mentioned, and their outer ends are attached by pivots to the outer ends of the teeth attached to the front plate, said teeth projecting a short distance beyond the triangular or saw shaped knives. The upper set of knives are comparatively narrow, and of taper form, and are attached at their inner ends by pivots to a bar having a reciprocating motion, which is of course also communicated to the upper knives. By this arrangement, as will be presently shown, the knives operate with a "drawing cut," and the upper knives have the greatest length of vibration at their inner ends, and consequently prevent any choking or clogging of the knives at the angles of the lower set of teeth.

To enable others skilled in the art to make and use my invention, I will proceed to describe its construction and operation.

A represents the frame of the machine, to the front cross-piece, B, of which are attached permanently the teeth $a$. (See more particularly Fig. 2.) C is a cross-bar, to which are secured a series of knives or cutters, $b$, of triangular shape, similar to the teeth of a saw. The cross-bar C and knives or cutters $b$ rest upon the upper surfaces of the teeth $a$. (See Fig. 3.)

D is a cross-bar directly back of the front cross-piece, B. To this cross-piece the inner ends of a series of knives, $c$, are attached by pivots $d$, (see dotted lines, Figs. 1 and 2,) the outer ends of said knives $c$ being attached to the outer ends of the teeth $a$ by pivots $e$. The knives $c$ are placed over the knives $b$.

E is a cross-plate attached to the frame A, said plate covering a portion of the knives $c$—their inner ends or shanks.

F, Fig. 1, is a lever connected to the cross-bars C D by pivots $f\,g$, said lever having its fulcrum at $h$ on the cross-piece B.

G is a connecting-rod, by which motion is communicated to the cross-bar C from the crank H at the end of the shaft I.

J is a pinion on the shaft I. This pinion meshes into a spur or driving wheel, K, which is hung on the axle of the wheel L of the frame, which wheel bears upon the ground, and, as it revolves, communicates motion to the knives.

M is a roller attached to the side of the frame opposite to the wheel L, the roller M and wheel L supporting the frame A.

Operation: As the machine is moved along, the grass or straw passes between the cutting-edges of the two sets of knives, and the wheel L, as it revolves, communicates motion to the shaft I by means of the spur or driving wheel K and pinion J. The crank H on the end of the shaft I gives a reciprocating motion to the cross-bar C and knives $b$ by means of the connecting-rod G. The cross-bar C communicates an opposite reciprocating motion to the cross-bar D, to which the inner ends of the knives $c$ are attached by means of the lever F. Now, it will be seen that as both sets of knives are operated a drawing cut is obtained upon the grass or straw, because the outer ends of the knives $c$ are secured by pivots to the outer ends of the teeth $a$, and the inner ends of the knives $c$ have a greater length of vibration. This will be understood by referring to Fig. 1, the red lines indicating the position of one of the knives $c$ at the opposite length of the stroke of the lever F.

The great difficulty attending most harvesting-machines is the clogging or choking of the knives $b$ at the angles. This difficulty I have completely obviated, for the knives $c$, being arranged as described, move over these angles (which I will designate by $i$, see Fig. 1) with a considerable sweep or length of vibration, and this has a tendency to keep the angles clean or free from choking with grass or straw.

The object of the drawing-cut is to save power, as the grass or straw is cut much easier thereby. This principle is well understod by mechanics, and they endeavor to obtain it in almost every branch of cutting machinery.

I do not claim two series of movable knives or cutters independent of the arrangement herein shown and described, for they have been previously used; but,

Having thus described the nature and operation of my invention, what I claim as new, and desire to secure by Letters Patent, is—

1. The peculiar manner of arranging the two sets or series of knives $b\ c$, as herein shown and described.

2. The knives $b$, being of triangular form or saw-shaped and having a reciprocating motion, and the knives $c$, working directly over the knives $b$, said knives $c$ being attached by pivots to the outer ends of the teeth $a$, and having an opposite reciprocating motion communicated to them at their inner ends by the lever F and cross-bar D, by which arrangement a drawing cut is obtained, and the knives effectually prevented from clogging or choking by the grass or straw.

WM. G. HUYETT.

Witnesses:
  ISAAC F. KAY,
  E. McKIERNAN.